United States Patent [19]
Garwin

[11] 3,800,256
[45] Mar. 26, 1974

[54] ENERGY STORAGE AND SWITCHING WITH SUPERCONDUCTORS

[75] Inventor: Richard L. Garwin, Yorktown Heights, N.Y.

[73] Assignee: The United States of America as represented by the United States Atomic Energy Commission, Washington, D.C.

[22] Filed: Apr. 24, 1973

[21] Appl. No.: 354,042

[52] U.S. Cl............................. 335/216, 62/3, 62/79, 62/175
[51] Int. Cl............................................ H01v 11/16
[58] Field of Search............... 307/149; 336/DIG. 1; 335/216; 321/8 CD; 323/44 F; 340/173.1; 62/3, 79, 175, 203, 441

[56] References Cited
UNITED STATES PATENTS

| | | | |
|---|---|---|---|
| 3,743,759 | 7/1973 | Genesey | 335/216 X |
| 3,683,200 | 8/1972 | Francken | 307/113 |
| 3,611,740 | 10/1971 | Giger | 335/216 X |
| 3,513,421 | 5/1970 | Schindler et al. | 335/216 |
| 3,259,887 | 7/1966 | Garwin | 62/3 X |
| 3,233,155 | 2/1966 | Atherton | 335/216 |

Primary Examiner—Herman Hohauser
Assistant Examiner—William J. Smith
Attorney, Agent, or Firm—John A. Horan; Robert W. Weig

[57] ABSTRACT

The disclosure relates to a superconducting energy storage and switching apparatus. A superconducting energy storing device, such as a coil, is surrounded and cooled by, for example, liquid helium. A switch comprising a material having relatively high resistivity when normal and superconducting at very low temperatures is electrically connected to the superconducting energy storage device. The switch is immersed in a dewar separate from the coil so that the temperature of the switch can be controlled independently of the temperature of the coil to provide electrical switching capability without loss of energy storing efficiency.

3 Claims, 9 Drawing Figures

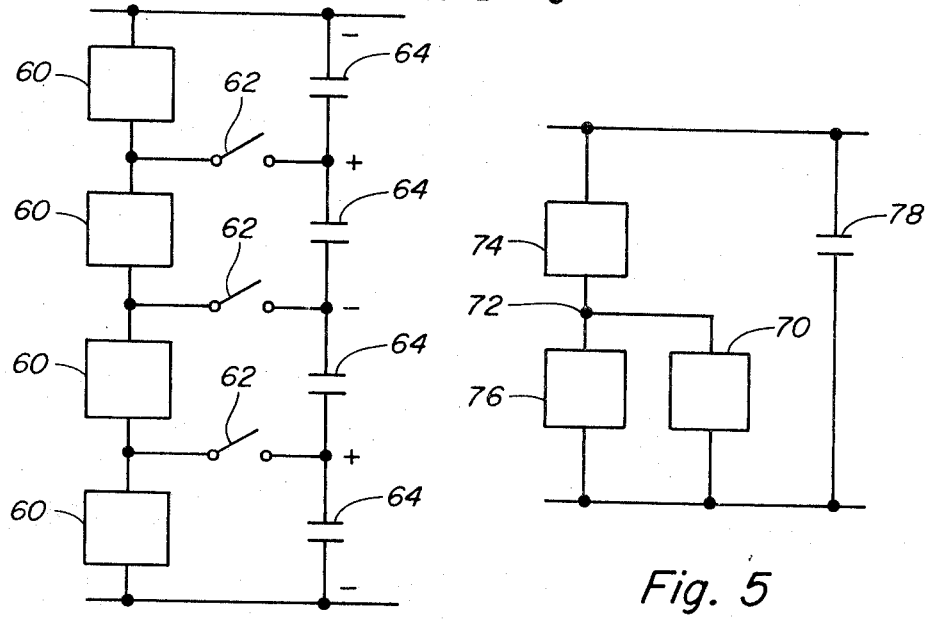
Fig. 4
Fig. 5
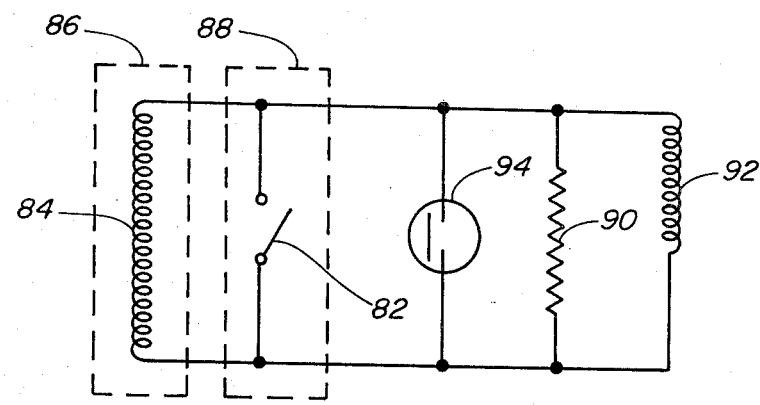
Fig. 6

ENERGY STORAGE AND SWITCHING WITH SUPERCONDUCTORS

The invention described herein was made in the course of, or under, a contract with the U. S. ATOMIC ENERGY COMMISSION.

FIELD OF THE INVENTION

The invention relates to energy storage and switching systems and more particularly to an apparatus and method for energy storage and switching using superconductors.

BACKGROUND OF THE INVENTION

At very low temperatures, certain metals, alloys, and compounds go through a superconducting transition into a state in which the electrical resistance has a value of zero. The critical temperature of the superconductor and the critical magnetic field characterize the material. Persistent electric currents can be induced in a superconducting ring, and show no signs of decay.

Apart from variations in parameters, the phenomena of superconductivity are essentially similar from substance to substance.

The technology of superconductivity is relatively new. In particular, the area of alternating current, energy storage, and switching using superconducting devices and methods is presently less than a decade old. Thus, what may appear a simple problem in conventional electronics or electrical engineering, may pose great difficulties when one contemplates using superconducting devices. One may then ask, why use superconducting systems?

There are many reasons, but basically, high energy loads may be transferred through superconducting systems with relatively high efficiency, i.e., low energy loss. In addition, superconducting systems are particularly suitable in certain specialized applications. For example, the superconducting system of the present invention is highly useful as a power source for magnetic fields in pulsed thermonuclear reactors.

The next generation of experiments on the scientific feasibility of pulsed thermonuclear reactors will need energies in the hundreds of megajoules for the adiabatic compression and millisecond containment of the thermonuclear plasma. It appears that superconducting inductive energy storage will be the most economical method to provide these energies.

SUMMARY OF THE INVENTION

In accordance with the invention, there is provided a superconducting energy storage and switching apparatus and method. A superconducting storage device, such as a coil, is immersed in a coolant such as liquid helium in a first container or dewar. Electrically connected to the coil is a superconducting switch in a separate dewar or container. The switch has relatively high resistivity when normal, i.e., above its transition temperature, and is superconducting at very low temperatures. Because the switch is in a separate container, its temperature can be separately and independently controlled from the temperature of the superconducting storage device.

One object of the present invention is to reduce the cost of refrigeration in operating superconducting energy storing and switching systems.

Another object of the present invention is to provide an improved superconducting energy storing and switching apparatus and method offering increased efficiency when compared to prior art apparatus and methods.

One advantage of the present invention is that the apparatus and method in accordance therewith offer improved efficiency over prior art systems.

Another advantage of the invention is that it offers reduced operating costs compared to the costs of operating a typical prior art system.

BRIEF DESCRIPTION OF THE DRAWINGS

Other objects and advantages of the present invention will be apparent to those skilled in the art from the following description with reference to the appended drawings wherein like numbers denote like parts, and wherein:

FIG. 4 illustrates still another embodiment in accordance with the invention;

FIG. 5 schematically shows yet another embodiment of the invention;

FIG. 6 is a representation of yet still another embodiment of the invention;

DETAILED DESCRIPTION OF THE INVENTION

Figure 1:
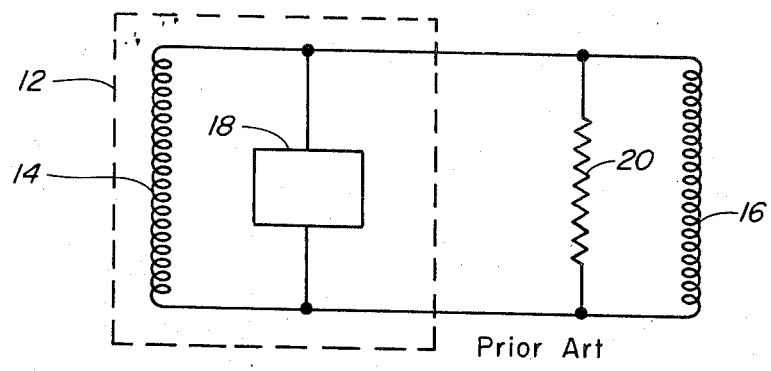
FIG. 1 shows the prior device over which the invention offers improvements.

FIG. 1 illustrates a typical prior art energy storing superconducting coil and switch. Within a container or dewar 12, schematically shown by the dashed line, resides a superconducting energy storing coil 14. The dewar 12 is maintained at the temperature of liquid helium (He). Such coils and dewars are well known to those skilled in the art so no detailed description of these elements need be made herein. Current from coil 14 is to be transferred to a parallel combination of an inductance 16 and a protective resistance 20, both maintained at normal temperatures. A superconducting switch 18 is also disposed within dewar 12 and hence maintained at the same temperature as the coil 14, i.e., at the temperature of liquid He.

When switch 18 is driven normal, i.e., above its transition temperature, it introduces a resistance which is large compared to the protective resistance 20 into the path of the current circulating through superconducting coil 14. With such a prior art system, one can transfer about 25 percent of the energy stored in superconducting coil 14 into inductance 16. However, 50 percent of the energy stored in coil 14 dissipates into the parallel combination of superconducting switch 18 and protective resistance 20. Indeed, if the normal resistance of superconducting switch 18 is "$n$" times the resistance of protective resistance 20, only $1/(n + 1)$ of the dissipated energy goes into switch 18.

In the system of FIG. 1, all energy dissipated in the superconducting switch 18 is dissipated at liquid He temperatures and eventually must be removed with the expenditure of a large amount of work required by the Carnot efficiency. For example, if one desires to transfer one megajoule to inductance 16, and if the resistance of switch 18 when driven normal becomes 10 times that of resistance 20, $10^5$ joules are dissipated in switch 18. This requires $10^8$ joules of energy to power the refrigerator to remove that heat from the liquid He bath. The factor "$n$" should be as large as possible, but the volume of material required for the superconducting switching, and its cost, goes up linearly with "$n$." Thus, with this prior art device, one either pays a lot of money for the superconducting switch, the refrigeration, or both.

Figure 2:
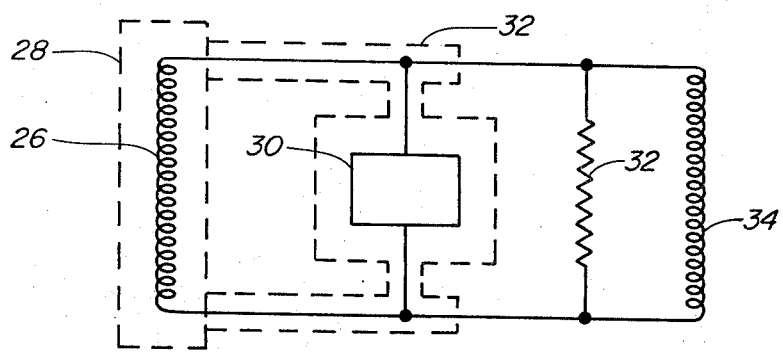
FIG. 2 schematically illustrates a preferred embodiment of the invention.

The invention provides an economical, efficient and simple solution to the above problems. In accordance with the invention, a separate refrigerant container or dewar is provided for the superconducting switch. Referring now to FIG. 2, a superconducting coil 26 is immersed in a refrigerant such as liquid He within a container 28 represented by a first dashed line. A superconducting switch 30 is immersed in a second container 32 outlined by a second dashed line. A protective resistance 32 and an inductance 34 are electrically connected across switch 30 and coil 26. To drive switch 30 normal, one removes the liquid He from dewar 32 to a separate reservoir (not shown), and pulses switch 30 by any means well known to those skilled in the art. Thus, the temperature of switch 30 rises substantially above 4 Kelvin (K) to perhaps from about 600 to about 1,000 K. One then partially cools the switch 30 with, for example, an air bath or by immersing it in water. Then, the switch is immersed in liquid nitrogen (N) and eventually totally cooled to its superconducting state by the introduction of liquid He into its dewar 32.

Thus, in practicing the invention, most of the energy dissipated in switch 30 is removed above room temperature at no cost in refrigeration. Most of the remaining energy is removed by supplying refrigerant at liquid N temperature, at a cost of about 1 percent of the cost of liquid He refrigeration. Only a very small fraction of the energy absorbed by the switch 30 needs to be removed by liquid He. By utilizing the invention, one reduces the cost of refrigeration for each switching cycle by about a factor of $10^3$. In addition, the invention substantially reduces the amount of superconductor required for the switch.

Figure 3:
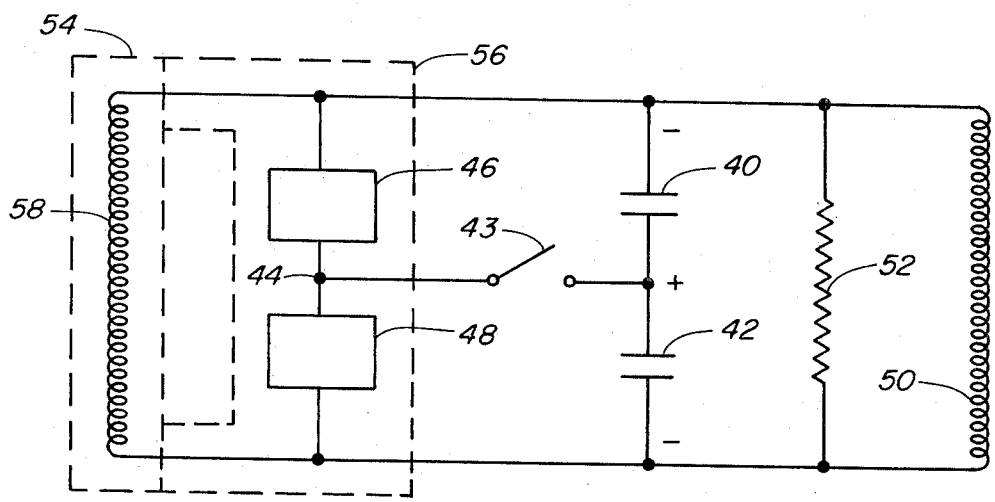
FIG. 3 shows another embodiment of the invention.

The embodiment of FIG. 3, as well as the embodiments of FIGS. 4 and 5 provide means for efficiently driving superconducting switches normal. As shown in FIG. 3, a capacitor bank comprising two capacitors, 40 and 42, charged in opposition as shown, are discharged through switch 43 with the switch indicated as the midpoint 44 of two superconducting subswitches 46 and 48, each consisting of one-half of a superconducting switch such as 18 or 30 of FIG. 1 or 2, respectively. Separate dewars 54 and 56, represented by dashed lines, encompass the superconducting switch 44, 46, 48 and superconducting coil 58. If the current flowing through the capacitor bank is large compared with the current circulating through a resistance 52 and an inductance 50, at a normal temperature, the subswitches are heated equally. The two lines across which coils 50 and 58 as well as switch 44, 46, 48, are connected remain at the same potential. Thus, none of the energy or current from capacitors 40 and 42 goes through these circuit elements.

If the voltages on capacitors 40 and 42 are very high, the switch 44, 46, 48 can be divided into an even larger even number of superconducting subswitches 60 such as shown in FIG. 4. Subswitches 60 are connected through switches 62 to capacitors 64 charged with alternate polarity, as shown in the figure. With such a circuit, the voltage on each capacitor 64 does not increase beyond the individual capacity of each capacitor. Too, the voltages can be retained within the range where capacitative energy storage is the least expensive.

FIG. 5 illustrates still another way of switching a superconducting switch. As shown therein, a source of radio-frequency (RF) voltage 70 is connected to the midpoint 72 of two subswitches 74 and 76. An RF bypass capacitor 78 of small magnitude is connected across the two main lines of the superconducting energy storage system. The RF current produces skin effect heating in the surface of the normal, usually copper (Cu), conductor in which the superconducting switch wire is embedded. The wire is sufficiently thin for heat to rapidly transfer from the normal conductor to the superconductor, thereby raising the temperature of the latter above its transition temperature.

Alternatively, the RF generator 70 of FIG. 5 can be replaced with a high energy flashlamp, such as is used to pump high energy lasers. Coating the superconducting switch with carbon black and winding it in an open weave pattern will allow it to uniformly absorb enough energy to drive the superconducting material normal to effect switching.

FIG. 6 illustrates still another embodiment of the invention. This embodiment further reduces the energy dissipation resulting from switching within liquid He. Superconducting switch 82 and superconducting energy storing coil 84 reside in separate dewars 86 and 88, respectively, within the areas defined by the dashed lines. Normal temperature resistance 90 and inductance 92 are connected across superconducting switch 82 and superconducting coil 84. In addition, a high current circuit breaker 94 operated at room temperature also bridges coil 84 and switch 82. The circuit breaker can have a resistance of $10^{-3}$ ohms or less. After a circulating current is established through coil 84 and switch 82, the circuit breaker 94 is closed and switch 82 is mechanically opened. The current therefore passes through circuit breaker 94 instead of switch 82. A fraction of a second later, circuit breaker 94 is opened and the current travels into resistance 90 to produce a voltage which initiates a current buildup in inductance 92.

For very high voltages, such as those on the order of 100 kV, the circuit breaker 94 may be oil immersed. Furthermore, at the time circuit breaker 94 opens, a high pressure shock wave may be propagated into the oil from, for example, an explosion, to move the conductor of the breaker and to increase the pressure of the oil to more effectively quench the arc formed or to prevent arc formation.

After energy transfer, the circuit breaker is reclosed, following the closing of switch 82 to provide energy buildup in the coil 84-switch 82 circuit. The separate dewar 88 provides mechanical access to switch 82.

The superconducting energy storing device can comprise a coil 20 cm long, with an i.d. of 14 cm and 450 to 1,000 turns. Such a coil can store energies of up to about 10 kJ. The conductor can comprise braided insulated 0.02 cm diam (8 mil) twisted multifilament niobium-titanium (Nb-Ti) wires with copper to superconductor ratios between 1 and 5. Since transposition cannot be perfect, current redistribution among parallel paths has to be permitted during the charging of the coil. This is done by using a solderable polyurethane insulation and soldering shorts at regular intervals across the wires in the braid. Unfortunately, the inherent springiness of braided materials makes the coils very compressible so that the Lorentz force can cause wire motion which in turn produces the old degradation phenomenon. Bonding or potting reduces this degradation, but potting inevitably entails reduced heat transfer. An alternative means of achieving a less compressible structure is to have a circular braid of superconducting wires braided over a tightly compressed core of fiberglass cord. Such a coil does attain short sample critical currents, at least in the 14 cm × 20 cm size. However, a solid, mixed matrix superconductor where each Nb-Ti filament is surrounded by a copper shell and is in turn distributed throughout a cupronickel matrix, offers the rigidity needed to reduce motion sensitivity and usually performs up to its short sample characteristics. The optimal amount of stabilizing copper to superconductor represents a trade-off between eddy current losses while the superconducting state is preserved, and joule losses if the coil should be driven into the cryoresistive regime. Exact calculation of the losses in the superconducting state is difficult, especially with a mixed matrix so that these limits are obtained empirically.

For switching with repetition times of 15 to 30 minutes, the use of a normal going superconductor as the switch offers simplicity and reliability, in spite of refrigeration costs.

The economic requirement of high normal state resistance in the switch generally makes copper stabilization unacceptable. Multifilament Nb-Ti in a cupronickel matrix combines high current densities and a high resistivity with solderability and ease of handling. The desired current levels are obtained by braiding a suitable number of wires in parallel. The steepness of the critical current density curves at low fields explains an apparent lack of additivity for the critical currents as measured on single wires relative to the tightly made braid. Even so, current densities of $5 \times 10^5$ amperes per square centimeter (A/cm$^2$) are attainable within the Nb-Ti filaments and the use of spacers or filler materials within the braid can reduce proximity effects and further increase current densities.

Most circuits respond to an increase in resistance with a drop in current. For a superconducting switch this can lead to stationary or only slowly increasing resistances which are less than the fully normal resistance of the switch. Proper latching at full resistance is only obtained by delivering sufficient energy to the switch to raise its temperature and that of all closely coupled material above the critical temperature of the superconductor.

Figure 7:
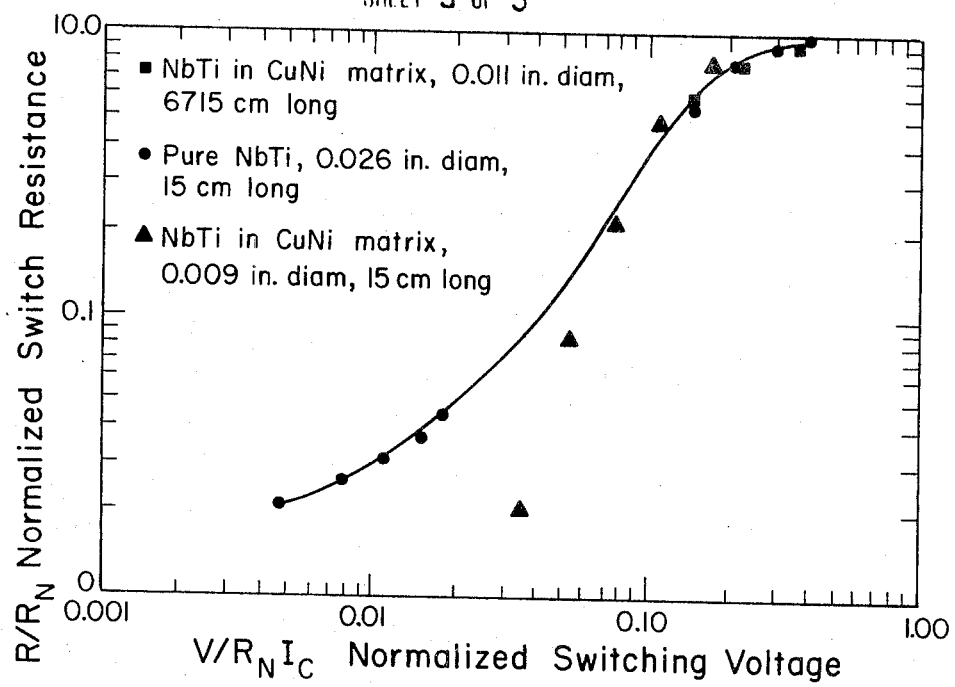
FIG. 7 is a graphical showing of variation of switch resistance with voltage in current density switching.

FIG. 7 exemplifies the partial switching phenomenon for a number of short and long wires. For current density switching, the normalized switch resistance — $R_S$ at 10 to 1,000 $\mu$ divided by the fully normal resistance $R_N$ — is a function of the normalized applied voltage — $V_S$ (furnished by a capacitor, a transformer, or a battery) divided by $I_C R_N$ (where $I_C$ is the critical current in the switch). This empirical relation does not specify the length of time $V_S$ needs to be applied but it suggests that 30 percent of the normalized voltage is needed to obtain 90 percent of the fully normal resistance.

Figure 8:
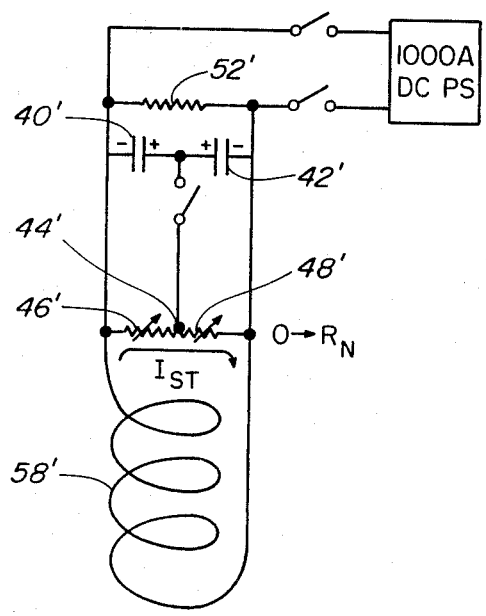
FIG. 8 is a schematic showing energy transfer in a circuit in accordance with the invention having two capacitors for full normalization of its superconducting switch.

The actual performance of a switch depends critically on its geometry, inductance, and on the circuit into which it has been incorporated. FIG. 8 gives the presently preferred arrangement for current density switching with a center tapped switch. It will be noted that the circuit of FIG. 8 is similar to the circuit of FIG. 3. Superconducting energy storing coil 58', superconducting switch 44', 46', 48', capacitors 40' and 42', and normal temperature resistance 52' correspond to their unprimed counterparts in FIG. 3. This arrangement insures that most of the energy stored in the capacitors will be delivered into the switch. There are no bypasses for the switching current. Apparent switching times measured as 15 microseconds ($\mu$s) or less are determined by the inductance of the switching circuit rather than being limited by any material properties of the switch.

Studies on magnetic switching indicate that due to the steepness of the critical current density curve at low fields, pulsed fields of 0.1 to 1 T (1 to 10 kG) are sufficient to initiate switching. However, the attainment of fully normal resistance and of reliable latching presents a problem similar to that seen in current density switching. It appears desirable to match switch (or series load) inductance to the field pulse, so as to maximize energy transfer into the switch.

Figure 9:
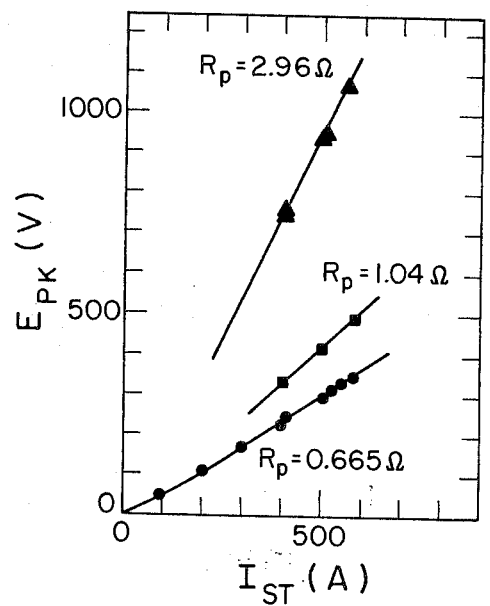
FIG. 9 is a graphical representation of peak voltages generated during energy transfer within the circuit of FIG. 8 from a superconducting storage coil into resistive loads, as a function of stored current ($I_{ST}$) and load resistance ($R_P$), with a switch resistance ($R_N$) of 5.4 ohms.

The circuit shown in FIG. 8 is used for the transfer of energy from superconducting storage coils with inductances between 18 and 70 millihertz (mH) and critical currents between 500 and 1,000 amperes (A) into resistive loads of up to 5 ohms. FIG. 9 is a plot of peak output voltage, $E_{PK}$, as a function of the stored current, $I_{ST}$, for various values of the load resistance, $R_P$. The superconducting switch used in this run was braided from 13 wires of 0.02 cm cupro-nickel matrix Nb-Ti with 22 filaments and a matrix to superconductor ratio of 2.8:1. It is 14.3 m long, has a normal state resistance of 5.4 ohms and a critical current of 570 A in zero applied field. Fully normal resistance is obtained at capacitor voltages between 3 and 4 kilovolts (kV). Capacitor discharge is effected by a spark gap. Switch resistance at early times, i.e., at the peak voltage or current, is calculated from the difference between the stored current and the peak current transferred into $R_P$. Analysis of the long term voltage and current decays yields a time constant which depends on the coil inductance and on an effective resistance $R_F$. This resistance presents the value of the parallel combination of the switch resistance and of $R_P$, and thus allows one to calculate the switch resistance at later times. If $R_F$ is larger than $R_P$ and increases with time, some of the storage coil is losing its superconductivity and becoming resistive. This has been seen in one coil with large eddy current heating.

The normal going superconducting switch does impose an additional refrigeration load compared to a high current circuit breaker operating at room temperature. However, the option of designing the switch and transfer circuit so that the temperature of the switch will rise to about or above 300 K together with the possibility of staged refrigeration (in a large system) makes the cost of refrigeration reasonable at relatively long repetition times.

The invention has been described in detail with particular reference to preferred embodiments thereof, but it will be understood that variations and modifications can be effected within the spirit and scope of the invention.

I claim:

1. A superconducting energy storage and switching apparatus comprising:
   superconducting means for storing energy;
   first refrigeration means for containing and cooling said superconducting energy storing means;
   superconducting switching means having high resistivity at normal temperatures electrically connected to said superconducting energy storing means; and
   second refrigeration means for containing and cooling said switching means physically distinct from said first refrigeration means such that the temperatures of said switching means and said energy storing means can be independently controlled.

2. The invention of claim 1 wherein said switching means comprises a plurality of at least two superconducting switches in series.

3. The invention of claim 2 further comprising an output circuit comprising a plurality of at least two capacitors in series connected across said switching means, said plurality of capacitors corresponding in number to said plurality of switches, each of said capacitors being charged in opposition to any adjacent capacitor.

* * * * *